Figure 1:
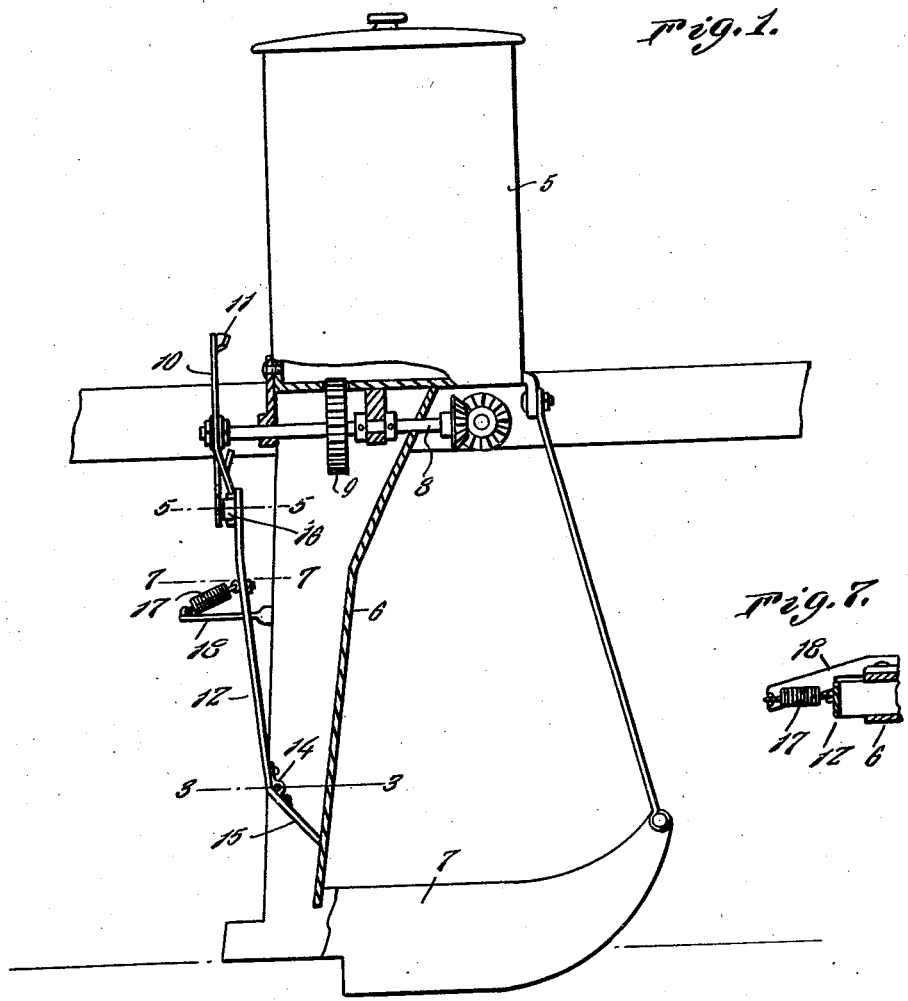

April 22, 1930.　　　　F. J. BOSS　　　　1,755,498
HILL DROPPER
Filed June 21, 1928　　　2 Sheets-Sheet 1

Inventor
Frank J. Boss
By Clarence A. O'Brien
Attorney

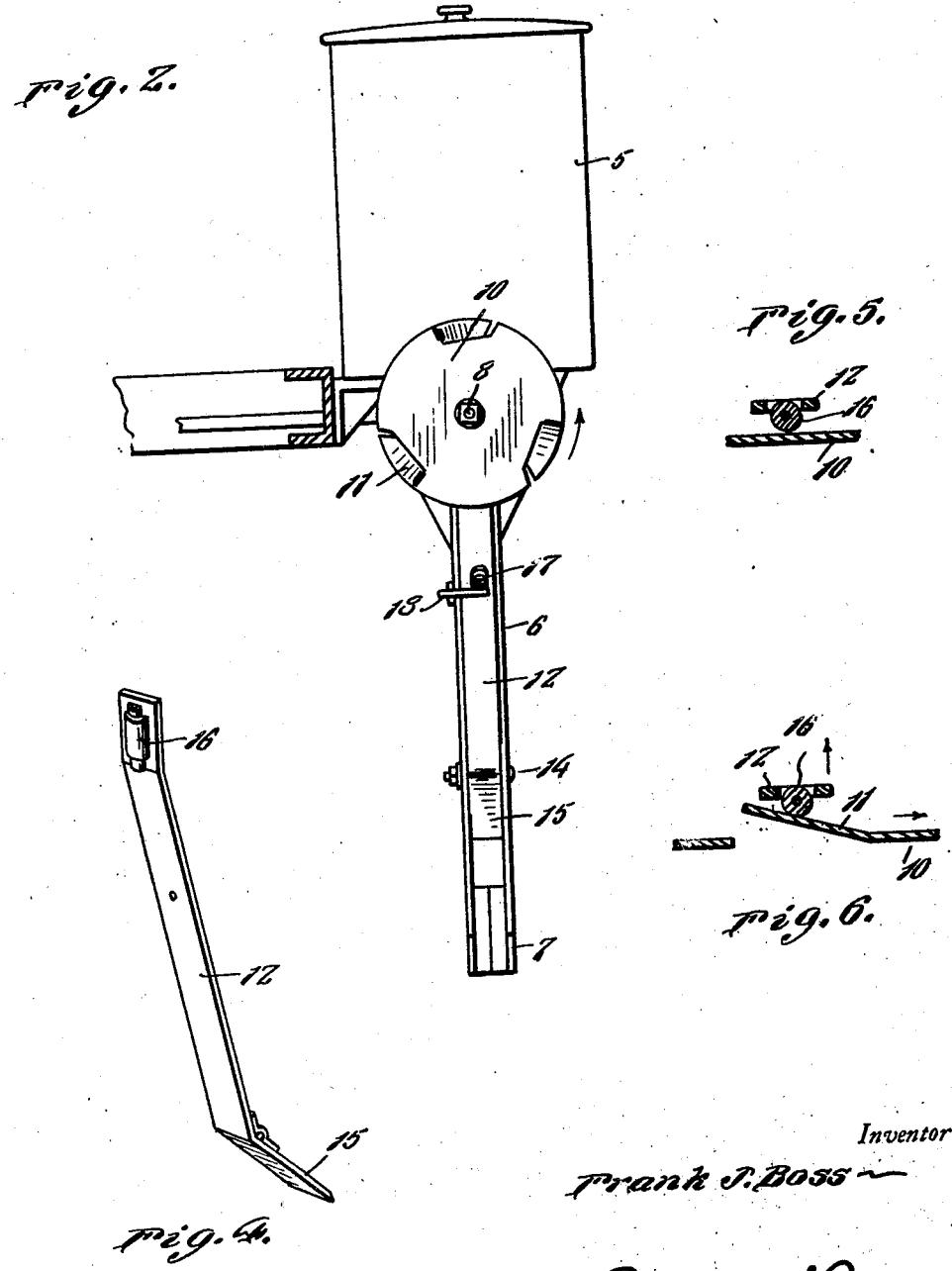

Patented Apr. 22, 1930

1,755,498

UNITED STATES PATENT OFFICE

FRANK J. BOSS, OF EDINBURG, TEXAS

HILL DROPPER

Application filed June 21, 1928. Serial No. 287,124.

The present invention relates to a hill dropper for cotton, corn, beans, etc. and has for its object to provide an exceedingly simple structure which operates in an efficient and reliable manner and is well adapted to the purpose intended.

With the above and numerous other objects in view as will appear as the description proceeds, the invention resides in certain novel features of construction, and in the combination and arrangement of parts as will be hereinafter more fully described and claimed.

Figure 2:
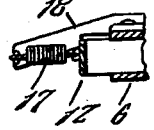
Figure 3:
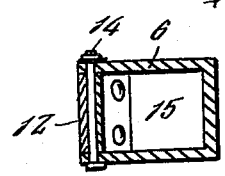

In the drawing:

Figure 1 is a sectional elevation of the hill dropper embodying the features of my invention, Figure 2 is a view taken at right angles to that shown in Figure 1, Figure 3 is a detail transverse section taken substantially on the line 3—3 of Figure 1, Figure 4 is a perspective view of the trigger plate, Figure 5 is a detail sectional view taken substantially on the line 5—5 of Figure 1, Figure 6 is a similar view showing the disk rotated with one of the cam members in action, Figure 7 is a detail section taken on the line 7—7 of Figure 1.

Referring to the drawings in detail it will be seen that the numeral 5 denotes a seed box with a boot 6 depending downwardly therefrom with the rear side open and extending to the rear of the planter shoe 7.

The numeral 8 denotes the shaft of the seed box for operating the delivery wheel 9. This shaft is extended and on its rear end is provided with a disk 10 having portions adjacent the extremity thereof struck therefrom and curved out of the plane of the disk to provide cams 11.

A trigger plate 12 is bent intermediate its ends adjacent its lower ends and is pivotally mounted at said end as is indicated at 14 between the sides of the boot 6 so that the lower portion 15 functions as a valve.

On the upper end of the trigger plate 12 there is journaled a roller 16 to be engaged by the cam 11 for causing the rocking of this trigger plate so as to drop at predetermined points with seed collected on the valve end 15.

The valve end is normally held closed by a spring 17 engaged with the upper portion of the plate 12 and with a curved arm 18 fixed to the boot 8.

From the above detailed description it will be seen that as the planter moves in the usual well known manner and the seeds are delivered from the seed box 5 to the boot 6, said seeds collect in groups on the valves 15 and are dropped at regular intervals depending upon the number of cams 11 provided on the disk and spaced between said cams as will be quite apparent.

The advantage of this structure is first to save chopping, second in case of a beating rain, it will break the crust (which a single plant would not do,) and third the device will save about one-half the seed.

Furthermore in the case of small weeds the operator can let more soil roll toward the cotton plant without covering it. Obviously this structure may be used on a one or more row planter.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of this invention as hereinafter claimed or sacrificing any of its advantages.

Having thus described my invention, what I claim as new is:

A planter attachment of the class described wherein the planter includes a seed box with a boot projecting downwardly therefrom and a shaft with means thereon for delivering the seed from the seed box to the boot; comprising a disc on the shaft having portions of its body struck therefrom out of the plane of one side face thereof to form hands, an elongated trigger plate of angular construction pivotally mounted in the boot, so that the lower portion of the plate crosses the boot and the other portion of the plate extending the length of the boot, a roller carried by the upper end of the plate engaging one face of the disc and the cam projecting therefrom, and spring means connected to the plate and boot for holding the lower end of the plate normally across the boot.

In testimony whereof I affix my signature.

FRANK J. BOSS.